(12) United States Patent
Rediger et al.

(10) Patent No.: US 8,778,495 B2
(45) Date of Patent: Jul. 15, 2014

(54) PHENOL-FORMALDEHYDE NOVOLAC RESIN HAVING LOW CONCENTRATION OF FREE PHENOL

(75) Inventors: Richard A. Rediger, Conyers, GA (US); Edward Lucas, Asbury, WV (US)

(73) Assignee: Gerogia-Pacific Chemicals LLC, Atlanta, GA (US)

( * ) Notice: Subject to any disclaimer, the term of this patent is extended or adjusted under 35 U.S.C. 154(b) by 1 day.

(21) Appl. No.: 13/563,879

(22) Filed: Aug. 1, 2012

(65) Prior Publication Data

US 2012/0295114 A1 Nov. 22, 2012

Related U.S. Application Data

(62) Division of application No. 11/747,343, filed on May 11, 2007.

(51) Int. Cl.
*B32B 5/16* (2006.01)
*B32B 9/00* (2006.01)

(52) U.S. Cl.
USPC ........... 428/407; 428/403; 428/404; 523/145; 523/146; 523/139; 524/314; 507/220

(58) Field of Classification Search
USPC .................................................. 428/403, 407
See application file for complete search history.

(56) References Cited

U.S. PATENT DOCUMENTS

| | | | |
|---|---|---|---|
| 4,097,463 A | 6/1978 | Culbertson | |
| 4,113,700 A | 9/1978 | Culbertson | |
| 4,252,700 A * | 2/1981 | Funabiki et al. | 523/145 |
| 4,273,179 A * | 6/1981 | Gardikes | 164/521 |
| 4,414,379 A | 11/1983 | Koyama et al. | |
| 4,443,347 A * | 4/1984 | Underdown et al. | 507/219 |
| 4,546,124 A | 10/1985 | Laitar | |
| 4,692,479 A | 9/1987 | Schneider et al. | |
| 4,698,377 A * | 10/1987 | Laitar | 523/143 |
| 4,857,624 A | 8/1989 | DeBlasi et al. | |
| 4,897,170 A * | 1/1990 | Chandramouli | 204/294 |
| 4,961,795 A | 10/1990 | Detlefsen et al. | |
| 5,043,412 A * | 8/1991 | Chandramouli et al. | 528/129 |
| 5,179,177 A | 1/1993 | Gerber | |
| 5,223,601 A | 6/1993 | Chum et al. | |
| 5,264,535 A | 11/1993 | Geoffrey et al. | |
| 5,281,644 A | 1/1994 | Iyer et al. | |
| 5,340,888 A * | 8/1994 | Lemon et al. | 525/501 |
| 5,639,806 A * | 6/1997 | Johnson et al. | 523/208 |
| 5,652,047 A | 7/1997 | Hesse et al. | |
| 5,658,360 A * | 8/1997 | Keil | 51/298 |
| 5,739,255 A | 4/1998 | Dando et al. | |
| 5,760,104 A | 6/1998 | Gerber | |
| 6,316,583 B1 | 11/2001 | Gerber | |
| 6,387,994 B1 | 5/2002 | Gore | |
| 6,605,354 B1 | 8/2003 | Gerber | |
| 6,620,901 B2 | 9/2003 | Chen | |
| 2002/0054994 A1 | 5/2002 | Dupre et al. | |
| 2004/0014831 A1 | 1/2004 | Nakamura et al. | |
| 2006/0094853 A1 | 5/2006 | Arbuckle | |
| 2008/0280787 A1 | 11/2008 | Rediger | |

FOREIGN PATENT DOCUMENTS

| | | |
|---|---|---|
| DE | 205914 | 1/1984 |
| EP | 0367373 A1 | 5/1990 |
| EP | 0401796 A2 | 12/1990 |
| WO | 93/03086 A1 | 2/1993 |
| WO | 97/04921 A1 | 2/1997 |

OTHER PUBLICATIONS

International Search Report and Written Opinion of the International Search Authority for PCT/US08/62898 mailed Jul. 30, 2008.
Hoffman, Douglas, J., "Solvent Substitution to Reduce Air Emissions for the FRP Industry", A Waste Reduction Study Funded Through a North Carolina Pollution Prevention Pays Challenge Grant, Greenville, NC.
Dibasic ester (DBE) Brochure, Invista, 2006.
Lewis, Richard J., Sr. "Novolak" from "Hawley's Condensed Chemical Dictionary" (14th Edition) [online]. John Wiley & Sons. http://knovel.com/web/portal/browse/display?_EXT_KNOVAL_DISPLAY_bookid=704&VerticalID=0 [retrieved on Apr. 27, 2009].

\* cited by examiner

*Primary Examiner* — Irina Krylova
(74) *Attorney, Agent, or Firm* — Ram W. Sabnis

(57) ABSTRACT

A phenol-formaldehyde novolac resin having a low concentration of free phenol prepared by distilling residual phenol from a molten novolac resin and replacing at least a portion of the phenol with a solvent having a volatility equal to or less than phenol. Such modified novolac resins are suitable for the production of resin coated molding sands for shell molding and sand cores, as well as for the production of resin coated proppants for use in oil and gas recovery operations.

20 Claims, No Drawings

PHENOL-FORMALDEHYDE NOVOLAC RESIN HAVING LOW CONCENTRATION OF FREE PHENOL

CROSS-REFERENCE TO RELATED APPLICATION

This application is a divisional of co-pending U.S. patent application Ser. No. 11/747,343, filed on May 11, 2007, and published as U.S. Publication No. 2008/0280787, which is incorporated by reference herein.

FIELD OF THE INVENTION

The present invention relates to a solid, thermoplastic phenol-formaldehyde resin, i.e., a solid novolac resin, having a low concentration of free phenol prepared by replacing the phenol with a non-phenol solvent thus making the resin more environmentally friendly.

BACKGROUND OF THE INVENTION

Phenol-formaldehyde novolac resins can be produced by reacting a molar excess of phenol with formaldehyde in the presence of an acid catalyst, such as sulfuric acid, hydrochloric acid or, oxalic acid (usually in an amount of 0.2 to 2% by weight based on the phenol). To prepare the so-called "high ortho" novolac resins, the strong acid catalyst is typically replaced by a divalent metal oxide (e.g., MgO and ZnO) or an organic acid salt of a divalent metal (e.g., zinc acetate or magnesium acetate) catalyst system. In either case, maintaining a molar excess of phenol, by maintaining the mole ratio of phenol to formaldehyde at, for example, 1:0.7-0.9, is common when preparing such resins.

The novolac resins so-produced are thermoplastic, i.e., they are not self-crosslinkable. Such novolac resins are converted to cured resins by, for example, reacting them under heat with a crosslinking agent, such as hexamine (also called hexa or hexamethylenetetramine), or for example, by mixing them with a solid acid catalyst and paraformaldehyde and reacting them under heat. Novolac resins also may be cured with other cross linkers such as resoles and epoxies.

Novolac resins have many uses. One major use of such resins is as a binder in the foundry industry for making sand molds and sand cores, and particularly as a coating for sand used in such applications. In one such application, a solid novolac resin is used to coat a suitable foundry sand for use in manufacturing molds and cores as follows: the solid novolac resin, generally in flake form, is added to preheated sand (200° F. to 400° F.) (93° C. to 204° C.) in a suitable production coater, the temperature being above the melt point of the novolac (typically 170° F. to 200° F.) (77° C. to 93° C.). The heat causes the novolac resin to melt and the mixing action uniformly coats the surface of the sand. Subsequent to achieving uniform coating, an aqueous solution of hexa (hexamine) is added. The added water cools the coated sand through evaporation. This cooling rapidly drops the temperature of the coated sand and stops (prevents) the curing of novolac resin by the hexamine. The so-coated sand is discharged and further cooled and screened. This free-flowing, coated sand now has a thermosetting coating and can be molded into cores and molds.

In an alternative approach, instead of directly using a solid novolac which is heated to produce a melt, a liquid novolac also can be used to coat the sand particles. Such liquid novolac resins comprise a solution of the solid novolac resin in a suitable solvent, such as methanol or ethanol. The liquid novolac is prepared by adding a solvent to a melt of the solid resin. During the coating of the sand the added solvent is evaporated using the "warm air" process. The liquid novolac is added to sand, which may be at an ambient temperature or pre-warmed, allowed to mix and coat the sand for about one to two minutes. At this time, a powdered hexamine and wax, sometimes added as premixed together, are added and mixing is continued. Following the mixing, warm or hot air is blown onto the mixing, coated sand to evaporate any remaining solvent. The sand is discharged, cooled and screened to remove large lumps.

The aggregate most often used with the novolac foundry resin binder for making cores and molds is natural silica but other aggregates that can be similarly coated and used include zirconia, chromite, olivine, ceramics and fused silica (hereinafter referred to as foundry mold aggregates).

Novolac resins also find similar use in the coating of proppants used in connection with hydrocarbon recovery efforts. Proppants are used to hold open fractures created during hydraulic fracturing operations that are used to enhance the recovery of hydrocarbon deposits from subterranean formations. Proppants generally have a larger grain (particle) size than the aggregates that are used for manufacturing foundry shells and cores. Nonetheless, the coating process is very similar with the exception that in some applications the novolac-hexamine coating may be allowed to achieve full cure in the mixer prior to discharge of the coated particles. As recognized by those skilled in proppant technology, proppants can include silica, ceramics, bauxite, and lighter density materials such as walnut, and porous ceramics.

The novolac resins used in such coating operations generally contain a relatively large amount (for example, about 3 to 7% by weight) of free phenol, in part because of the need to use an excess of phenol as a starting material during the synthesis of the novolac resin. Free phenol generally will be in an excess of from about 10 to 20% following the completion of the reaction between phenol and formaldehyde, depending primarily on the mole ratio used to produce the novolac resin.

This excess phenol creates a potential environmental concern as the phenol is volatilized during both the coating operation and during the eventual cure of the coated particles when used to make the foundry shells and cores, and/or coated proppants.

Even so, the residual phenol in the solid novolac plays an important role, acting similarly to a plasticizer and solvent for the novolac resin allowing the resin to flow more freely as the novolac is heated to its molten state. Removing the free phenol completely (or even to lower levels) causes an opposite effect, reducing the ability of the novolac resin to flow as it is heated to a melt. For example, a resin exhibiting a melt viscosity of 3,000 cps at a 4% level of free phenol, may exhibit a melt viscosity above about 5,000 cps if the free phenol is reduced to about 1.5% or lower and will typically exhibit a melt viscosity of 6,000 to 7,000 cps or higher if the free phenol is reduced to about 1% or lower.

The quantity of free phenol may be reduced further and to some extent quite easily (for example, to about 1.5% and lower) by removing the residual phenol by any of several established techniques, including heating, preferably with a vacuum assist, azeotropic distillation and thin film evaporation. However, reducing the level of free phenol beyond the earlier mentioned limits is not done without the noted consequence. In particular, as the level of free phenol is reduced further the processability of the resulting novolac resin (usually provided in flake form) is compromised, especially the flow characteristics of the resin melt as relates to the coating of foundry aggregates and the subsequent cured binder strength and the ability to maintain crosslink density for coated proppants.

Thus, when the lowered phenol-content novolac resin is used to coat an aggregate, the higher melt viscosity of the resin prevents a more uniform coating. Resin melt viscosity will decrease, or the melt becomes thinner with increasing temperature and the sand temperature to be coated can be raised. And, while a higher coating temperature might be attempted, to counteract the higher viscosity characteristic of the melt at a particular temperature, this approach becomes counter-productive. The higher temperatures employed leads to premature curing of the resin in the presence of the added hardener and accordingly a loss of tensile strength in the eventual product, such as a sand core or sand mold, made from the novolac resin.

One prior art approach attempting to solve this problem has been to synthesize what is called a "greener" resin. A greener resin is a lower molecular weight resin made using a higher excess of phenol at the time the resin is synthesized. Or in other words, the mole ratio between the phenol and formaldehyde is increased. If the original resin mole ratio was 1:0.75 (P:F), then a greener mole ratio would be less than this value, say for example 1:0.70 (P:F). Because of its lower molecular weight, the "greener" resin exhibits a lower viscosity at a given level of free phenol. For example, one can synthesize a novolac resin that exhibits a viscosity of about 1,500 cps at a 4% level of free phenol. When distilled down to a free phenol content of about 1.5%, the novolac resin exhibits a viscosity in the range of 3,000 cps to about 4,000. Unfortunately, because of the relatively high cost of phenol relative to formaldehyde, using higher levels of excess phenol to synthesize the novolac resin is generally disfavored. More importantly, this "greener" approach also reduces the tensile strength and integrity of the cores and molds made from the resin-coated aggregates, by creating a lower cross-link density in the resin due to the lower molecular weight of the resin.

There is also a benefit in reducing the residual level of free phenol in novolac resins used to coat frac sand (and other aggregates) for the manufacture of resin coated proppants. In some hydrocarbon recovery operations, any free phenol in the resin that leaches out of the coated proppant during use may interfere with the frac fluid viscosity as the proppant is being pumped into the fracture zone of the subterranean formation. Just as in the case of a foundry resin binder, in order to have a novolac resin that still retains an adequate flowability at 0.1 to 0.2% free phenol during the procedure for coating the proppant, the mole ratio used to make the resin must be much lower. This lower mole ratio, again called a "greener" mole ratio, results in a much lower melt viscosity at 0.1 to 0.2% free phenol. The unfortunate drawback to this approach is that the lower mole ratio novolac resin produces a less densely cured network in the coating when the novolac is finally cured on the proppant. This less dense cross-linked network results in a lower strength in the coated proppant with a lowered ability to resist crushing from the geologic formation, in which the closure stress may be up to 8,000 psi and higher.

Thus, there is a continuing need in the novolac resin art for a method of reducing the level of free phenol in novolac resins without severely compromising the properties of the resin and especially the flow property of the molten resin as it is heated, especially as it applies to the coating of foundry aggregates and proppants and their subsequent performance.

DETAILED DESCRIPTION OF THE INVENTION

The present invention is directed to a solid phenol-formaldehyde novolac resin, generally in solid, e.g., flake, form having a reduced concentration of free phenol. The invention may also be used to make a liquid form of these solid resins as well.

The present invention is particularly directed to a way for reducing the concentration of free phenol in a solid novolac resin without compromising the properties of the novolac resin and especially the flow property of the molten novolac resin and is also directed to the resulting residual low free phenol-containing solid novolac resin itself.

In accordance with the method of the present invention, the novolac resin is synthesized to a sufficient molecular weight such that the resin exhibits a desired melt viscosity, e.g., 2,000 to 6,000 cps, at a typical level of free phenol, e.g., at a free phenol content of 3 to 7%. Synthesizing such a novolac resin is conventional in the prior art and may use a phenol to formaldehyde mole ratio of, for example, 1:0.7-0.9. The so-prepared resin then is treated, such as by a vacuum distillation, to reduce the phenol content to less than 1.5% by weight, preferably to less than 1.0% by weight, and more preferably to less than 0.5% by weight, which has the consequence of undesirably increasing the melt viscosity of the resin.

While the resin is in a molten state (preferably before the newly synthesized resin is cooled to a solid), a non-phenolic solvent of an equivalent or lower volatility to phenol (i.e., an equal boiling or a higher boiling solvent) is added to the novolac resin melt as a phenol replacement. The added solvent reduces the viscosity of the melt, preferably substantially back to the viscosity that the melt exhibited before the phenol was removed. A melt viscosity of not greater than 5,000 cps, preferably not greater than 4,000 cps, and more preferably not greater that 3,000 cps is obtained by the addition of the non-phenolic solvent. Thereafter, the resin is cooled to a solid and generally is flaked. The solid resin is then ready for use in a conventional manner.

In accordance with the present invention, the viscosity of a molten novolac resin may be measured by any of several means available to those skilled in the art such as the known cone and plate type measuring instrument. The viscosity measurements reported for the molten novolac resins in this application were measured at a melt temperature of 150° C. (302° F.) using a Thermosel® with a number 21 spindle and model DV-II Digital Viscometer, all available from Brookfield Engineering, Middleboro, Mass. 02346. The spindle speed is varied, as necessary, to keep the measured viscosity reading within 20% to 80% of the 100% scale span. With the spindle number supplied, the Digital Viscometer displays the viscosity in centipoises directly.

Thus, the addition of the non-phenolic solvent improves the low free phenol resin's melt fluidity and related coating characteristics and thus improves the cured binder performance of foundry molds and cores and the strength of coated proppants made from the resin. This technique applies to both solid and liquid novolac resins used for foundry shell molding applications as well as to novolac resins used for the coating of proppants for oil and gas recovery operations. As noted earlier, such liquid novolac resins are prepared by dissolving the solid novolac resin of this invention in a suitable solvent, such as methanol or ethanol.

The method of this invention allows one to maintain (obtain) the desired theoretical crosslink density in the subsequently cured novolac resin at a lower level of free phenol in the resin. Thus, the resin exhibits good molded tensile strengths and a suitable resistance to thermal burnout, all at a lower free phenol content, when it is cured on the addition of a hardener. Since the bulk of the phenol content has been replaced, the resin also exhibits significantly less phenol emissions, both as the aggregate, e.g., sand, is coated and when the coated aggregate is cured, such as when a coated foundry aggregate is ultimately molded into shells and cores and cured.

Using the present invention, a novolac resin, like GP-222G71 available from Georgia-Pacific Chemical LLC, Atlanta, Ga., used for coating aggregates in the manufacturing of coated sand for foundry molds and cores, can be made and the free phenol reduced to at or below 0.5 to 1.0% (by weight) through distillation. The resulting high melt viscosity of the molten resin can then be reduced through the back addition of the non-phenolic solvent as described below in more detail. The resulting resin will readily coat the aggregate, to produce a coated sand with a low free phenol residue and have the ability to achieve a sufficient cross link density to exhibit a high strength when cured.

Using the present invention, a novolac resin, like GP-2202 available from Georgia-Pacific Chemical LLC, Atlanta, Ga., used for coating aggregates in the manufacturing of coated proppants, can be made and the free phenol reduced to at or below 0.2 to 0.5% through distillation. The resulting high melt viscosity of the molten resin can then be reduced through the back addition of the non-phenolic solvent. The resulting resin will readily coat the aggregate to produce the coated proppant with low free phenol residue and thus minimize interactions with the frac fluids and also retain the ability to achieve a sufficient cross link density on cure to exhibit a high strength, or resist crushing.

The present invention is applicable to any solid novolac resin, and its subsequent use either as a solid or as a liquid, and is not to be limited to any particular way of initially synthesizing the novolac resin. The initial synthesis of the novolac resin thus does not form a part of the present invention.

The synthesis of the novolac resin can be carried out by reacting phenol and formaldehyde at an elevated temperature in the presence of a controlled amount of a catalyst, typically an acid catalyst. Any catalyst suitable for synthesizing a novolac resin can be used and the present invention is not limited to any particular catalyst chemistry.

The present invention also is not limited to any particular source of formaldehyde. Suitable formaldehyde sources include conventional formalin solutions, as well as materials such as paraformaldehyde, which produce formaldehyde under the conditions of the phenol-formaldehyde condensation reaction.

While the present invention is not limited solely to the use of phenol as the phenolic monomer for synthesizing the novolac resin, such that the phenolic monomer can be a phenol compound which is unsubstituted or which is substituted, e.g., with alkyl, phenyl or alkoxy group. Use of phenol itself in synthesizing the novolac resin is particularly preferred. Typical phenolic monomers are the mononuclear or binuclear, monohydroxyphenols which have at least one ortho or para position available for bonding.

While other substituted phenol compounds could be used in the synthesis and not "counted" as free phenol, these other substituted phenol compounds present problems of their own and their use should generally be avoided. In particular, most substituted phenols exhibit less reactivity in cross linking compared to phenol itself, thus compromising the strength of the cured coating. In the simplest case, o-cresol could be used, but the odor this material imparts at concentrations of greater than 2 to 4% makes it use undesirable. Also there still remain environmental issues associated with the potential toxicity of the cresols.

Thus, the preferred phenolic monomer is phenol itself, though other possible phenolic monomers suitable for use in a small amount include alpha-naphthol; phenylphenol; cresols, e.g., 2-methylphenol and 3-methylphenol; various xylenols, e.g., 2,5-dimethylphenol and 3,5-dimethylphenol; other alkyl phenols; and alkoxyphenols such as 2-methoxy- or 3-methoxyphenol and bisphenol-A and bisphenol-F. Mixtures of phenolic monomers also can be used. Again the preferred phenolic monomer is unsubstituted phenol, i.e., phenol itself.

The molar ratio of phenol to formaldehyde (P:F) typically used to synthesize a phenol-formaldehyde novolac resin generally lies between 1:0.5 and 1:0.95, more usually between 1:0.6 and 1:0.8 and most often between 1:0.7 and 1:0.8. Usually, the amount of excess phenol should be sufficient to establish a P:F mole ratio of about 1:0.85 or lower, in order to minimize the possibility of resin gelation. Generally the P:F mole ratio is kept above a mole ratio of about 1:0.55 to insure an adequate cross link density and accompanying tensile when fully cured. Another factor influencing the choice of the molar excess of phenol to use in making the novolac resin is the molecular weight range generally desired for the resin itself, with a lower molar excess of the phenol monomer generally leading to higher molecular weights in the resulting novolac resin.

In accordance with the present invention, after the synthesis of the resin (and preferably before the just-synthesized molten resin is cooled to a solid), at least a portion of the free phenol content of the resin is replaced with a non-phenolic solvent of an equivalent or lower volatility.

Following synthesis of the novolac resin, unreactecd (free) phenol is removed from the reaction mixture so as to bring the free phenol content of the novolac resin to less than about 1.5%, usually to less than about 1.0%, often to less than about 0.75% and most often to less than 0.5% by weight of the novolac resin solids. It is particularly useful to reduce the level of free phenol down to a level below 0.2% by weight of the novolac resin solids, i.e., about 0.1% by weight.

Removal of the unreacted phenol is achieved by any of a wide variety of conventional means such as by flash distillation, by heating the reaction mixture at an elevated temperature under vacuum, by azeotropic distillation, by thin film evaporation and the like. The present invention is not to be limited to any particular technique for reducing the level of free phenol in the novolac resin. Thus, in one approach the novolac resin can be heated up to a temperature of about 190° C. or 200° C. under a vacuum of about 25 to 30 inches of mercury. Steam sparging under vacuum at such temperatures can also be used to assist the removal of phenol in the product novolac resin. Generally a temperature of about 150° C. should be sufficient to assist the removal of the free phenol from the novolac resin.

Once the level of free phenol in the novolac resin has been reduced and preferably while the resin is still in a fluid (molten) state, a non-phenolic solvent having an equivalent volatility, or preferably a lower volatility than phenol is added to the molten novolac resin. As used throughout the specification and claims, the phrase "an equivalent or a less volatile solvent" or any related phrase is a relative term and depends upon the volatility of the phenolic monomer or mixture of monomers specifically used in the synthesis of any particular novolac resin. Determining and/or identifying a specific "equivalent or less volatile solvent" in any particular novolac resin synthesis application is well within the ordinary skill of the art.

A suitable non-phenolic solvent should have a similar or more preferably a higher boiling point than phenol. The solvent needs to be miscible (compatible) with the solid (e.g., flake) novolac resin under ambient conditions (and with any additional solvent if the resin is to be used for making a liquid resin). The solvent should not be hazardous either as a liquid or when vaporized. For a resin destined to be used in a coated proppant application, it also is desirable to select a suitable solvent that also is compatible with the frac fluid chemistry.

A representative list of possible non-phenolic solvents having a suitable volatility, equal or less than phenol, includes aromatic solvents such as toluene, xylene, ethylbenzene, and mixed solvents having an aromatic content of at least 90% and a boiling point range of up to about 230° C. Certain non-phenolic polar solvents also may be suitable and include furfural, furfuryl alcohol, a glycol, such as ethylene glycol, or other polyols, Cellosolve acetate, butyl Cellosolve, butyl Carbitol, diacetone alcohol and "Texanol." An oil such as corn oil also may be suitable. A liquid epoxy resin, like Shell 828 Grade, possibly may be used.

In the case of novolac resins made with phenol itself (which boils at a temperature of about 181-182° C.), since phenol will be the normal choice of the phenolic component for the vast majority of the cases, one especially preferred choice for the equivalent or less volatile solvent is a dibasic ester, or a blend of dibasic esters, particularly one or more of diethyl malonate, dimethyl adipate, dimethyl glutarate and dimethyl succinate. Such dibasic esters and their blends have been commercially available from DuPont, Wilmington, Del. Dimethyl glutarate is believed to be commercially available under the trade designation DBE-5, and dimethyl adipate is believed to be available under the trade designation DBE-6. Suitable blends of the dibasic esters also are commercially available under the trade designations DBE, DBE-9 and DBE-2. DBE is understood to contain about 10% to about 25% dimethyl adipate, about 45% to about 65% dimethyl glutarate and about 20% to about 30% dimethyl succinate. DBE-9 contains approximately 73% dimethyl glutarate, 25% dimethyl succinate and 1.5% dimethyl adipate. DBE-2 is understood to contain about 20% to about 35% dimethyl adipate, about 65% to about 80% dimethyl glutarate, and up to 3% maximum of dimethyl succinate. The present invention is not limited to any particular dibasic ester, or blend of dibasic esters, but the ones identified above are preferred.

The amount of non-phenolic solvent to add to any particular novolac resin can be easily determined by routine experimentation. Usually an amount between about 1 and 8% by weight should be suitable in most cases and an amount between 2 and 6% is likely to be typical. The amount of non-phenolic solvent to add to a certain extent is dictated by the particular non-phenolic solvent chosen to use and the melt properties one wishes to impart to the subsequent molten form of the solid resin.

In its broadest aspect, the present invention is not limited to the addition of any specific amount of non-phenolic solvent to the molten resin before converting it to its cooled solid form. Generally, a sufficient amount of a non-phenolic solvent is added so that the solid novolac resin exhibits a melt viscosity close to the melt viscosity the resin had at the original higher free phenol level, typically no greater than about 30% higher than the original melt viscosity, preferably no greater than about 25% higher than the original melt viscosity, and usually no greater than about 20% higher than the original melt viscosity. If the resin had a melt viscosity of 3,000 cps at 4% (by weight) free phenol, and after the removal of the phenol to 1.0% (by weight), sufficient non-phenol solvent (approx 2 to 3%) would be added to bring the viscosity back to 3,000 cps or lower at the 1% (by weight) free phenol level. For the most part, a sufficient amount of a non-phenolic solvent is added so that the solid novolac resin exhibits a melt viscosity no greater than about 10% higher than the original melt viscosity.

In a general sense, typical melt viscosities of novolac resins prepared in accordance with the present invention will be less than 5,000 cps, preferably not greater than 4,000 cps, and more preferably not greater that 3,000 cps. These viscosities will be typical for novolac resins that contain less than 1.5% free phenol, preferably less than 1% free phenol and more preferably less than 0.5% free phenol, and which in the absence of the non-phenolic solvent would exhibit a melt viscosity above 5,000 cps, often a melt viscosity above 6,000 cps and usually a melt viscosity above 6,500 cps.

The phenol-formaldehyde novolac resin so-prepared is eventually cooled to a solid novolac resin form and is generally comminuted, e.g., flaked. In one embodiment, a crosslinking agent or hardener, such as hexamine, is added during a coating process which uses the resin in a liquid or molten form, to convert the resin from a thermoplastic composition to a thermosetting composition. The particular hardening agent and its method of addition as part of the solid novolac resin coating does not form a part of the present invention and any way for accomplishing that result is contemplated by the present invention.

It will be understood that while the invention has been described in conjunction with specific embodiments thereof, the foregoing description and following examples are intended to illustrate, but not limit the scope of the invention. Other aspects, advantages and modifications will be apparent to those skilled in the art to which the invention pertains, and these aspects and modifications are within the scope of the invention.

Example 1

A commercially available novolac resin (GP-222G71) 9,520 parts by weight, was melted at 150° C. in a pilot resin kettle. The kettle was equipped with internal heating, cooling, mixing, and reflux/distillation capabilities. Upon melting, the resin was sampled and determined to have a melt viscosity of 4,380 cps and 3.6% free phenol. Full vacuum (28 inches Hg) under distillation conditions was applied to the resin melt and 500 parts by weight water was slowly added via a charge line. The line was then closed to allow full vacuum conditions to be reestablished. The volatilization of the added water assisted the removal of phenol from the melt as phenol and water form an azeotrope during the distillation. When the resin contained in the kettle again reached 150° C. the sequence of adding water, vacuum distillation, and reheating was repeated two more times. Then following water addition and distillation, the vacuum was released and the resin examined for its melt viscosity and free phenol content, which were determined to be 6,700 cps and 1.1% respectively.

At this point, 405 parts by weight of a dibasic ester blend (DBE-2) along with 200 parts by weight of salicylic acid (to compensate for the loss of salicylic acid originally part of the novolac resin composition and unavoidably lost during the removal of the free phenol—as salicylic acid will sublime off under this temperature and vacuum environment) were added to the resin melt. The melt was mixed for about 30 minutes and then removed from the kettle, cooled and flaked. The flaked resin had a melt viscosity of 2,370 cps and a free phenol content of 0.6%.

Example 2

The resin prepared in accordance with Example 1 was used to prepare coated sand, in parallel with a separate portion of the un-treated initial novolac resin (GP-222G71).

In each case, 3,000 parts by weight of Wedon 510 silica sand was preheated to over 400° F. (over about 204° C.) and added to a pre-heated sand mill. Once the temperature of the sand dropped to below 400° F. (below about 204° C.), 105 parts by weight of each of the respective resins was added to the mill and mixed for 45 seconds. Then, 16 parts by weight of hexamine, dissolved in 100 parts by weight water, was added. Mixing continued for 15 seconds and then 1 part wax was added. As mixing continued further, cool air was introduced onto the mixture until free-flowing coated sand grains began to form. About 2 minutes later, the coated sand was discharged from the mill, screened to a particular particle size range and allowed to cool to room temperature.

The two coated sand batches were then tested using standard tests as reported below in Table 1. The results reported in Table 1 demonstrate that the sand having the lower phenol content novolac resin maintained its ability to coat the sand and produce a coated sand product having equivalent or improved cold and hot tensile strength properties.

TABLE 1

| Property | Untreated Starting Resin | Example 1 Product |
|---|---|---|
| Sand Melt Point (° F.) [(° C.)] | 217 [103] | 215 [102] |
| Sand Two minute Hot Tensile (psi) | 150 | 160 |
| Sand One minute cold tensile (psi) | 165 | 200 |
| Resin Melt Viscosity (cps) | 4,380 | 2,370 |
| Resin Free Phenol (%) | 3.6 | 0.59 |

A commercially available novolac frac resin (GP-2202) in an amount of 2,040 grams was melted in a two liter glass lab resin kettle. The kettle was equipped with an external heating mantel, internal agitation and was configured for vacuum distillation. The solid resin was melted at 150° C. until a uniform molten mixture was obtained.

While the molten resin was being heated and stirred, a vacuum was applied over ten minutes until twenty-six inches of vacuum (Hg) was obtained. Vacuum distillation was continued until the molten resin temperature reached 175° C. At this point, the mixture was held under vacuum distillation for ten additional minutes. After this, the vacuum was released, a sample port opened and approximately twenty-five milliliters of water were slowly added to the stirring molten resin. The kettle was again sealed and full vacuum (26 inches Hg) slowly reapplied. Vacuum distillation was carried out until the temperature of the molted resin was again 175° C. The cycle of adding small amounts of water and vacuum distilling back to 175° C. and holding was done three times. Following the third cycle, the kettle was opened and 800 grams of molten resin material was poured out. To the remainder of the contents of the kettle, 30 grams of DBE-II was added and allowed to mix for ten minutes. At this point the kettle contents were poured out and allowed to cool. The recovered samples were measured for melt viscosity at 150° C. as well as free phenol content. The results are summarized below in Table 2.

TABLE 2

Resin Melt Viscosity and Free Phenol

| Resin sample | Melt viscosity @ 150° C. | Free phenol |
|---|---|---|
| Starting resin as received | 1,050 cps | 2.46% |
| Resin poured out at end of distillation | 2,560 cps | 0.45% |
| Resin with DBE-II added | 1,260 cps | 0.27% |

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification (other than the Examples) and in the claims the term "about" is intended to encompass + or −5%.

What is claimed is:

1. A coated particle, comprising:
   a particle selected from the group consisting of sand, silica, ceramic, and bauxite; and
   a coating comprising:
      a solid phenol-formaldehyde novolac resin containing less than 0.5 wt % free phenol; and
      about 1 wt % to about 8 wt % of a non-phenolic solvent consisting of a mixture of dibasic esters, wherein the solid phenol-formaldehyde novolac resin with the non-phenolic solvent has a melt viscosity of 1,260 cps at 150° C. to less than 5,000 cps at 150° C., wherein the mixture of dibasic esters comprises about 20 wt % to about 35 wt % dimethyl adipate, about 65 wt % to about 80 wt % dimethyl glutarate, and up to 3 wt % dimethyl succinate, wherein the solid phenol-formaldehyde novolac resin has a melting point of 77° C. to 93° C., and wherein the coating contains no other non-phenolic solvent.

2. The coated particle of claim 1, wherein the particle is ceramic.

3. The coated particle of claim 1, wherein the particle is sand.

4. The coated particle of claim 1, wherein the solid phenol-formaldehyde novolac resin is prepared at a phenol to formaldehyde molar ratio of 1:0.6 to 1:0.8.

5. The coated particle of claim 1, wherein the non-phenolic solvent is present in an amount between 2 wt % and 6 wt %.

6. The coated particle of claim 1, wherein the coating further comprises a crosslinking agent, and wherein the solid phenol-formaldehyde novolac resin is cured.

7. The coated particle of claim 1, wherein the coating further comprises a wax and a crosslinking agent.

8. The coated particle of claim 1, wherein the coated particle is a proppant.

9. The coated particle of claim 1, wherein the coated particle is a foundry mold aggregate.

10. The coated particle of claim 1, wherein the solid phenol-formaldehyde novolac resin has the melt viscosity of 1,260 cps at 150° C. to less than 4,000 cps at 150° C.

11. The coated particle of claim 1, wherein the solid phenol-formaldehyde novolac resin has the melt viscosity of 1,260 cps at 150° C. to less than 3,000 cps at 150° C.

12. A method comprising:
   depositing a coating at least partially onto a particle selected from the group consisting of sand, silica, ceramic, and bauxite, wherein the coating comprises:
      a solid phenol-formaldehyde novolac resin containing less than 0.5 wt % free phenol; and
      about 1 wt % to about 8 wt % of a non-phenolic solvent consisting of a mixture of dibasic esters, wherein the solid phenol-formaldehyde novolac resin with the non-phenolic solvent has a melt viscosity of 1,260 cps at 150° C. to less than 5,000 cps at 150° C., wherein the mixture of dibasic esters comprises about 20 wt % to about 35 wt % dimethyl adipate, about 65 wt % to about 80 wt % dimethyl glutarate, and up to 3 wt % dimethyl succinate, wherein the solid phenol-formaldehyde novolac resin has a melting point of 77° C. to 93° C., and wherein the coating contains no other non-phenolic solvent.

13. The method of claim 12, wherein the particle is sand and the coating further comprises a wax and hexamine.

14. The method of claim 12, wherein prior to depositing the coating at least partially onto the particle, the method further comprises:
- at least partially reacting a mixture comprising phenol and formaldehyde to provide a first phenol-formaldehyde novolac resin comprising free phenol;
- removing at least a portion of the free phenol from the first phenol-formaldehyde novolac resin to provide a second phenol-formaldehyde novolac resin having a reduced free phenol content relative to the first phenol-formaldehyde novolac resin; and
- adding the non-phenolic solvent to the second phenol-formaldehyde novolac resin having the reduced free phenol content to form the solid phenol-formaldehyde novolac resin.

15. The method of claim 14, wherein the first phenol-formaldehyde novolac resin is prepared from the mixture comprising phenol and formaldehyde at a phenol to formaldehyde molar ratio of 1:0.6 to 1:0.8.

16. The method of claim 12, wherein the solid phenol-formaldehyde novolac resin has the melt viscosity of 1,260 cps at 150° C. to less than 4,000 cps at 150° C.

17. The method of claim 12, wherein the method further comprises introducing the coated particle to a subterranean formation.

18. A coated proppant, comprising:
- a particle selected from the group consisting of silica, ceramic, and bauxite; and
- a coating disposed at least partially on the particle, wherein the coating comprises:
  - a solid phenol-formaldehyde novolac resin containing less than 0.5 wt % free phenol; and
  - about 1 wt % to about 8 wt % of a non-phenolic solvent consisting of a mixture of dibasic esters, wherein the mixture of dibasic esters comprises about 20 wt % to about 35 wt % dimethyl adipate, about 65 wt % to about 80 wt % dimethyl glutarate, and up to 3 wt % dimethyl succinate, wherein the solid phenol-formaldehyde novolac resin with the non-phenolic solvent has a melt viscosity of 1,260 cps at 150° C. to less than 5,000 cps at 150° C., wherein the solid phenol-formaldehyde novolac resin has a melting point of 77° C. to 93° C., and wherein the coating contains no other non-phenolic solvent.

19. The coated proppant of claim 18, wherein the coating further comprises a wax and hexamine.

20. The coated proppant of claim 18, wherein the particle is ceramic.

* * * * *